United States Patent
Chu et al.

(10) Patent No.: US 11,464,011 B1
(45) Date of Patent: Oct. 4, 2022

(54) ALLOCATING RESOURCE UNITS FOR MULTI-USER TRANSMISSIONS IN WIDE BANDWIDTHS

(71) Applicant: Marvell Asia Pte, Ltd., Singapore (SG)

(72) Inventors: Liwen Chu, San Ramon, CA (US); Hongyuan Zhang, Fremont, CA (US); Rui Cao, Fremont, CA (US); Yan Zhang, Palo Alto, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 62 days.

(21) Appl. No.: 16/827,495

(22) Filed: Mar. 23, 2020

Related U.S. Application Data

(60) Provisional application No. 62/821,933, filed on Mar. 21, 2019.

(51) Int. Cl.
*H04L 12/28* (2006.01)
*H04W 72/04* (2009.01)
*H04J 1/16* (2006.01)

(52) U.S. Cl.
CPC .............................. *H04W 72/0453* (2013.01)

(58) Field of Classification Search
CPC ............... H04W 72/04; H04W 72/042; H04W 72/0453; H04W 84/12; H04W 72/048; H04L 5/001
USPC ........................................ 370/252, 329, 430
See application file for complete search history.

(56) References Cited

U.S. PATENT DOCUMENTS

| | | | |
|---|---|---|---|
| 11,115,104 B2 | 9/2021 | Huang et al. | |
| 2011/0255620 A1 | 10/2011 | Jones, IV et al. | |
| 2015/0131517 A1 | 5/2015 | Chu et al. | |
| 2017/0013604 A1* | 1/2017 | Vermani | H04L 1/08 |
| 2019/0045461 A1 | 2/2019 | Fang et al. | |
| 2019/0123863 A1 | 4/2019 | Zhang et al. | |
| 2019/0253296 A1* | 8/2019 | Chen | H04L 5/0076 |
| 2019/0373586 A1 | 12/2019 | Verma et al. | |
| 2020/0153491 A1* | 5/2020 | Yang | H04L 25/0242 |
| 2020/0178299 A1 | 6/2020 | Yang et al. | |
| 2020/0413396 A1 | 12/2020 | Yu et al. | |

(Continued)

OTHER PUBLICATIONS

Wu et al., "Follow up discussions on Throughput Enhancement," IEEE Draft, Samsung, doc.: IEEE 802.11-17/1184r1, 17 pages (Jul. 9, 2018).

(Continued)

*Primary Examiner* — John Pezzlo

(57) ABSTRACT

A communication device determines that a communication channel to be used for a multi-user (MU) transmission spans a frequency bandwidth greater than 160 MHz. The communication device allocates one or more frequency resource units (RUs) for the MU transmission, including: in response to determining that the communication channel spans the frequency bandwidth greater than 160 MHz, selecting one or more frequency RUs from a second set of frequency RUs. The second set of frequency RUs omits at least some RUs of a smallest bandwidth that are included in a first set of RUs that is used for allocating frequency RUs for communication channels having bandwidths of at most 160 MHz. The communication device generates allocation information that indicates the allocation of the one or more frequency RUs for the MU transmission, and transmits the allocation information to one or more other communication devices in connection with the MU transmission.

20 Claims, 15 Drawing Sheets

(56) References Cited

U.S. PATENT DOCUMENTS

2021/0176643 A1\* 6/2021 Jang ..................... H04L 1/0008
2021/0176785 A1 6/2021 Jang et al.
2021/0250125 A1\* 8/2021 Park ................... H04L 27/2614

OTHER PUBLICATIONS

International Search Report and Written Opinion in International Patent Application No. PCT/US2020/027983, dated Jul. 3, 2020 (15 pages).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

Kwon et al., "SIG Field Design Principle for 11ax," Newracon, doc. IEEE 802.11-15/0344r2, Mar. 2015, 18 pages.

U.S. Appl. No. 16/847,326, Chu et al., "Allocating Resource Units for Uplink Mulit-User Transmissions in Wide Bandwidths," filed Apr. 13, 2020.

Wang, "IEEE P802.11, Wireless LANs, Specification Framework for TGaz," Revision 1.1, *Institute of Electrical and Electronics Engineers*, doc. IEEE 802.11-17/0462r4, May 11, 2017, 15 pages.

Zhang et al., "EHT Technology Candidate Discussions," doc: IEEE 802.11-18/1161r0, *The Institute of Electrical and Electronics Engineers, Inc.*, pp. 1-10 Jul. 8, 2018.

Non-Final Office Action in U.S. Appl. No. 16/847,326, dated Dec. 10, 2021 (14 pages).

Notice of Allowance for U.S. Appl. No. 16/847,346, dated Mar. 23, 2022 (10 pages).

\* cited by examiner

FIG. 8A

Table 1

| 8 bits indices (B7 B6 B5 B4 B3 B2 B1 B0) | #1 | #2 | #3 | #4 | #5 | #6 | #7 | #8 | Number of entries |
|---|---|---|---|---|---|---|---|---|---|
| 00000000 | 52 | 52 | 52 | 52 | 52 | 52 | 52 | 52 | 1 |
| 00000001 | 52 | 52 | 52 | 52 | 52 | 52 | 52 | 106 | 1 |
| 00000010 | 52 | 52 | 52 | 52 | 52 | 52 | 106 | 52 | 1 |
| 00000011 | 52 | 52 | 52 | 52 | 52 | 52 | 106 | 106 | 1 |
| 00000100 | 52 | 52 | 52 | 52 | 52 | 106 | 52 | 52 | 1 |
| 00000101 | 52 | 52 | 52 | 52 | 52 | 106 | 52 | 106 | 1 |
| 00000110 | 52 | 52 | 52 | 52 | 52 | 106 | 106 | 52 | 1 |
| 00000111 | 52 | 52 | 52 | 52 | 52 | 106 | 106 | 106 | 1 |
| 00001000 | 52 | 52 | 52 | 52 | 106 | 52 | 52 | 52 | 1 |
| 00001001 | 52 | 52 | 52 | 52 | 106 | 52 | 52 | 106 | 1 |
| 00001010 | 52 | 52 | 52 | 52 | 106 | 52 | 106 | 52 | 1 |
| 00001011 | 52 | 52 | 52 | 52 | 106 | 52 | 106 | 106 | 1 |
| 00001100 | 52 | 52 | 52 | 52 | 106 | 106 | 52 | 52 | 1 |
| 00001101 | 52 | 52 | 52 | 52 | 106 | 106 | 52 | 106 | 1 |
| 00001110 | 52 | 52 | 52 | 52 | 106 | 106 | 106 | 52 | 1 |
| 00001111 | 52 | 52 | 52 | 52 | 106 | 106 | 106 | 106 | 1 |

*FIG. 8B*

Table 1 (Continued)

| 8 bits indices (B7 B6 B5 B4 B3 B2 B1 B0) | #1 | #2 | #3 | #4 | #5 | #6 | #7 | #8 | Number of entries |
|---|---|---|---|---|---|---|---|---|---|
| $0001 0 y_2 y_1 y_0$ | 106 | | | | | | | | 8 |
| $0001 1 y_2 y_1 y_0$ | | 242 | | | | | 242 | | 8 |
| $0010 0 y_2 y_1 y_0$ | 52 | 52 | 52 | 106 | | 106 | | 106 | 8 |
| $0010 1 y_2 y_1 y_0$ | 52 | 52 | 52 | 52 | | | 242 | | 8 |
| $0011 0 y_2 y_1 y_0$ | | 106 | 52 | 52 | | | 242 | | 8 |
| $0011 1 y_2 y_1 y_0$ | | 106 | | 106 | | | 242 | | 8 |
| $0100 0 y_2 y_1 y_0$ | | | 242 | | 52 | 52 | | | 8 |
| $0100 1 y_2 y_1 y_0$ | | | 242 | | 52 | 52 | | | 8 |
| $0101 0 y_2 y_1 y_0$ | | | 242 | | | 52 | 52 | 52 | 8 |
| $0101 1 y_2 y_1 y_0$ | | | 242 | | 106 | | 52 | 106 | 8 |
| $0110 y_1 y_0 z_1 z_0$ | | | 242 | | | | 242 | | 8 |
| $0111 0000$ | 106 | 106 | 106 | 106 | 106 | 106 | 106 | 106 | 1 |

FIG. 8C

Table 1 (Continued)

| 8 bits indices (B7 B6 B5 B4 B3 B2 B1 B0) | #1 | #2 | #3 | #4 | #5 | #6 | #7 | #8 | Number of entries |
|---|---|---|---|---|---|---|---|---|---|
| 01110001 | | | | 484-tone RU empty | | | | | 1 |
| 01110010 | 996-tone RU with zero User fields indicated in this RU Allocation subfield of the HE-SIG-B content channel | | | | | | | | 1 |
| 01110011 | 2*996-tone RU with zero User fields indicated in this RU Allocation subfield of the HE-SIG-B content channel | | | | | | | | 1 |
| 011101$x_1x_0$ | | | | Reserved | | | | | 4 |
| 0111$y_2y_1y_0$ | | | | Reserved | | | | | 8 |
| 10$y_2y_1y_0z_2z_1z_0$ | | | 242 | | | 242 | | | 64 |
| 1000$y_3y_2y_1y_0$ | | | | 484 | | | | | 8 |
| 1001$y_3y_2y_1y_0$ | | | | 996 | | | | | 8 |
| 1010$y_3y_2y_1y_0$ | | | | 2*996 | | | | | 8 |
| 1011$y_3y_2y_1y_0$ | | | | Reserved | | | | | 8 |
| 111$x_4x_3x_2x_1x_0$ | | | | Reserved | | | | | 32 |

FIG. 9A

Table 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 52 | 52 | 52 | 52 | 26 | 52 | 52 | 52 | 52 | 1 |
| 00000001 | 52 | 52 | 52 | 52 | 26 | 52 | 52 | 52 | 52 | 1 |
| 00000010 | 52 | 52 | 52 | 52 | 26 | 52 | 52 | 52 | 52 | 1 |
| 00000011 | 52 | 52 | 52 | 52 | 26 | 52 | 52 | 52 | 52 | 1 |
| 00000100 | 52 | 52 | 52 | 106 | 26 | 52 | 106 | 52 | 106 | 1 |
| 00000101 | 52 | 52 | 52 | 106 | 26 | 52 | 106 | 52 | 106 | 1 |
| 00000110 | 52 | 52 | 52 | 106 | 26 | 52 | 106 | 52 | 106 | 1 |
| 00000111 | 52 | 52 | 52 | 106 | 26 | 52 | 106 | 52 | 106 | 1 |
| 00001000 | 52 | 106 | 52 | 52 | 26 | 52 | 52 | 52 | 52 | 1 |
| 00001001 | 52 | 106 | 52 | 52 | 26 | 52 | 52 | 52 | 52 | 1 |
| 00001010 | 52 | 106 | 52 | 52 | 26 | 52 | 52 | 52 | 52 | 1 |
| 00001011 | 52 | 52 | 52 | 52 | 26 | 52 | 52 | 52 | 52 | 1 |
| 00001100 | 52 | 106 | 52 | 106 | 26 | 52 | 106 | 52 | 106 | 1 |
| 00001101 | 52 | 106 | 52 | 106 | 26 | 52 | 106 | 52 | 106 | 1 |
| 00001110 | 52 | 106 | 52 | 106 | 26 | 52 | 106 | 52 | 106 | 1 |
| 00001111 | 52 | 106 | 52 | 106 | 26 | 52 | 106 | 52 | 106 | 1 |

FIG. 9B

Table 2 (Continued)

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00011$y_1y_0$ | 106 | | | | | | | 242 | | 8 |
| 00100$y_2y_1y_0$ | | 242 | | | 26 | 106 | | | 106 | 8 |
| 00101$y_2y_1y_0$ | 52 | 52 | 52 | | 26 | | | 242 | | 8 |
| 00110$y_2y_1y_0$ | 52 | 52 | | 52 | 26 | | | 242 | | 8 |
| 00111$y_2y_1y_0$ | | 106 | 52 | | 26 | | | 242 | | 8 |
| 01000$y_1y_0$ | | 106 | | 106 | 26 | | | 242 | | 8 |
| 01001$y_2y_1y_0$ | | 242 | | | 26 | 52 | 52 | 52 | 52 | 8 |
| 01010$y_2y_1y_0$ | | 242 | | | 26 | 52 | 52 | 52 | | 8 |
| 01011$y_2y_1y_0$ | | 242 | | | 26 | | 52 | 52 | 52 | 8 |
| 01100$y_2y_1y_0$ | | 242 | | | | 52 | 106 | | | 16 |
| 01101$y_2y_1y_0$ | | 242 | | | | 106 | | 242 | 106 | 1 |
| 01110000 | | | | | 484-tone RU empty | | | | | 1 |
| 01110001 | 484-tone RU with zero User fields indicated in this RU Allocation subfield of the HE-SIG-B content channel | | | | | | | | | 1 |
| 01110010 | | | | | Reserved | | | | | |
| 01110011 | 996-tone RU with zero User fields indicated in this RU Allocation subfield of the HE-SIG-B content channel | | | | | | | | | 1 |
| 011101$x_1x_0$ | | | | | Reserved | | | | | 4 |
| 01111$y_2y_1y_0$ | | 242 | | | 26 | | 242 | | | 8 |
| 10$y_2y_1y_0z_2z_1z_0$ | | | | | 484 | | | | | 64 |
| 11000$y_2y_1y_0$ | | | | | 996 | | | | | 8 |
| 11001$y_2y_1y_0$ | | | | | 2*996 | | | | | 8 |
| 11010$y_2y_1y_0$ | | | | | Reserved | | | | | 8 |
| 11011$y_2y_1y_0$ | | | | | Reserved | | | | | 8 |
| 111$x_4x_3x_2x_1x_0$ | | | | | | | | | | 32 |

FIG. 10A

Table 3

| 8 bits indices (B7 B6 B5 B4 B3 B2 B1 B0) | #1 | #2 | #3 | #4 | Number of entries |
|---|---|---|---|---|---|
| 00000000 | 52 | 52 | 52 | 52 | 1 |
| 00000001 | 52 | 52 | 52 | 52 | 1 |
| 00000010 | 106 | | 106 | | 1 |
| 00000011 | 106 | | 106 | | 1 |
| 00000100 | | 242 | | | 1 |
| 00000101 | | 484 | | | 1 |
| 00000110 | | 995 | | | 1 |
| 00000111 | | 2*996 | | | 1 |
| 00001000 | | 4*996 | | | 1 |
| 00001001 | | 2*996 + 242 | | | 1 |
| 00001010 | | 2*996+484 | | | 1 |
| 00001011 | | 2*996 + 996 | | | 1 |
| 0001$y_0y_1y_2y_3$ | | 242 | | | 16 |

FIG. 10B

Table 3 (Continued)

| 8 bits indices (B7 B6 B5 B4 B3 B2 B1 B0) | #1 | #2 | #3 | #4 | Number of entries |
|---|---|---|---|---|---|
| $0010 y_0 y_1 y_2 y_3$ | | 484 | | | 16 |
| $0011 y_0 y_1 y_2 y_3$ | | 996 | | | 16 |
| $0100 y_0 y_1 y_2 y_3$ | | $2*996$ | | | 16 |
| $0101 y_0 y_1 y_2 y_3$ | | $4*996$ | | | 16 |
| $0110 y_0 y_1 y_2 y_3$ | | $2*996+242$ | | | 16 |
| $0111 y_0 y_1 y_2 y_3$ | | $2*996+484$ | | | 16 |
| $1000 y_0 y_1 y_2 y_3$ | | $2*996+996$ | | | 16 |

ALLOCATING RESOURCE UNITS FOR MULTI-USER TRANSMISSIONS IN WIDE BANDWIDTHS

CROSS REFERENCES TO RELATED APPLICATIONS

This application claims the benefit of U.S. Provisional Patent Application No. 62/821,933, entitled "Resource Unit (RU) Indication for Downlink (DL) Multi-User (MU) Operation," filed on Mar. 21, 2019, which is incorporated herein by reference in its entirety.

FIELD OF TECHNOLOGY

The present disclosure relates generally to wireless communication systems, and more particularly to allocating frequency resource units (RUs) in a wireless local area network.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. One way in which data rates have been increased is by increasing the frequency bandwidth of communication channels used in WLANs. For example, the IEEE 802.11n Standard permits aggregation of two 20 MHz sub-channels to form a 40 MHz aggregate communication channel, whereas the more recent IEEE 802.11ax Standard permits aggregation of up to eight 20 MHz sub-channels to form up to 160 MHz aggregate communication channels. Work has now begun on a new iteration of the IEEE 802.11 Standard, which is referred to as the IEEE 802.11be Standard, or Extremely High Throughput (EHT) WLAN. The IEEE 802.11be Standard may permit aggregation of as many as sixteen 20 MHz sub-channels (or perhaps even more) to form up to 320 MHz aggregate communication channels (or perhaps even wider aggregate communication channels).

The current draft of the IEEE 802.11ax Standard (referred to herein as "the IEEE 802.11ax Standard" for simplicity) permits downlink (DL) multi-user (MU) transmissions in which an access point simultaneously transmits independent data streams to multiple client stations in different frequency segments (sometimes referred to as frequency resource units (RUs)) of a communication channel Additionally, the IEEE 802.11ax Standard defines an RU hierarchy comprising a plurality of levels of different RU bandwidths. For example, the 802.11ax Standard defines 26-tone RUs (having a frequency bandwidth of approximately 2.2 MHz), 52-tone RUs (having a frequency bandwidth of approximately 4.4 MHz), 106-tone RUs (having a frequency bandwidth of approximately 8.8 MHz), 242-tone RUs (having a frequency bandwidth of approximately 20 MHz), 484-tone RUs (having a frequency bandwidth of approximately 40 MHz), and 996-tone RUs (having a frequency bandwidth of approximately 80 MHz). The number of "tones" in each RU refers to a number of orthogonal frequency division multiplexing (OFDM) subcarriers or "tones" in the RU.

For a DL MU packet, a high efficiency (HE) signal field (referred to as "HE-SIG-B") in a physical layer (PHY) header of the packet includes allocation information that indicates i) allocation of RUs for a PHY data portion of the packet, and ii) which client stations correspond to which RU. Upon receiving the DL MU packet, a client stations analyzes the allocation information in the HE-SIG-B field to determine which RU includes a data stream for the client station.

SUMMARY

In an embodiment, a communication protocol defines a first set of frequency resource units (RUs) of different bandwidths for use with communication channels spanning at most 160 MHz and a second set of frequency RUs for use with communication channels spanning more than 160 MHz. The first set of frequency RUs includes at least a first subset of frequency RUs having a first bandwidth and a second set of RUs having a second bandwidth greater than the first bandwidth, and the second set of frequency RUs omits at least some of the frequency RUs in the first subset of frequency RUs of the first set of frequency RUs. In an embodiment, a method for allocating frequency resources for a multi-user (MU) communication in a wireless local area network (WLAN) includes: determining, at a communication device, that a communication channel to be used for an MU transmission spans a frequency bandwidth greater than 160 MHz; allocating, at the communication device, one or more frequency RUs for the MU transmission, including: in response to determining that the communication channel spans the frequency bandwidth greater than 160 MHz, selecting one or more frequency RUs from the second set of frequency RUs; generating, at the communication device, allocation information that indicates the allocation of the one or more frequency RUs for the MU transmission; and transmitting, by the communication device, the allocation information to one or more other communication devices in connection with the MU transmission.

In another embodiment, a communication device comprises a wireless network interface device having one or more IC devices. The one or more IC devices are configured to: determine that a communication channel to be used for an MU transmission spans a frequency bandwidth greater than 160 MHz; and allocate one or more frequency RUs for the MU transmission, including: in response to determining that the communication channel spans the frequency bandwidth greater than 160 MHz, selecting one or more frequency RUs from the second set of frequency RUs. The one or more IC devices are further configured to: generate allocation information that indicates the allocation of the one or more frequency RUs for the MU transmission; and control the wireless network interface device to transmit the allocation information to one or more other communication devices in connection with the MU transmission.

BRIEF DESCRIPTION OF THE DRAWINGS

FIGS. 8A-C illustrate a table (Table 1) corresponding to an example encoding of allocation information for a 40 MHz band within a communication channel spanning a bandwidth greater than 160 MHz, according to an embodiment.

FIGS. 9A-B illustrate a table (Table 2) corresponding to another example encoding of allocation information for a 40 MHz band within a communication channel spanning a bandwidth greater than 160 MHz, according to another embodiment.

FIGS. 10A-B illustrate a table (Table 3) corresponding to an example encoding of allocation information for a 20 MHz band within a communication channel spanning a bandwidth greater than 160 MHz, according to an embodiment.

DETAILED DESCRIPTION

A next generation wireless local area network (WLAN) protocol (e.g., the IEEE 802.11be Standard, sometimes referred to as the Extremely High Throughput (EHT) WLAN Standard) may permit aggregation of as many as sixteen 20 MHz sub-channels (or perhaps even more) to form 320 MHz aggregate communication channels (or perhaps even wider aggregate communication channels). For multi-user (MU) communications in which different frequency resource units (RUs) are allocated to different communication devices, allocation information must be communicated to the communication devices. For a communication channel that spans more than 160 MHz, the number of different possible allocations of RUs is relatively large, and thus a relatively large number of bits may be required to represent an RU allocation for a MU packet. Large numbers of bits used for RU allocation information reduces channel efficiency because channel time is required to transmit the RU allocation information and thus cannot be used for transmission of user data.

To improve channel efficiency for wide communication channels (e.g., communication channels that span more than 160 MHz), some frequency RUs (e.g., at least some frequency RUs of a smallest bandwidth) are not permitted to be used for an MU transmission, according to some embodiments, which helps to reduce a number of bits required to specify an allocation of frequency RUs for the MU transmission. Additionally, example techniques for encoding allocation information for allocation of RUs in a wide communication channel (e.g., a communication channel that spans more than 160 MHz), according to various embodiments, are described herein. Further, example techniques for transmitting signal fields within subchannels of a wide communication channel (e.g., a communication channel that spans more than 160 MHz), the signal fields containing frequency RU allocation information, according to various embodiments, are described herein.

Figure 1:
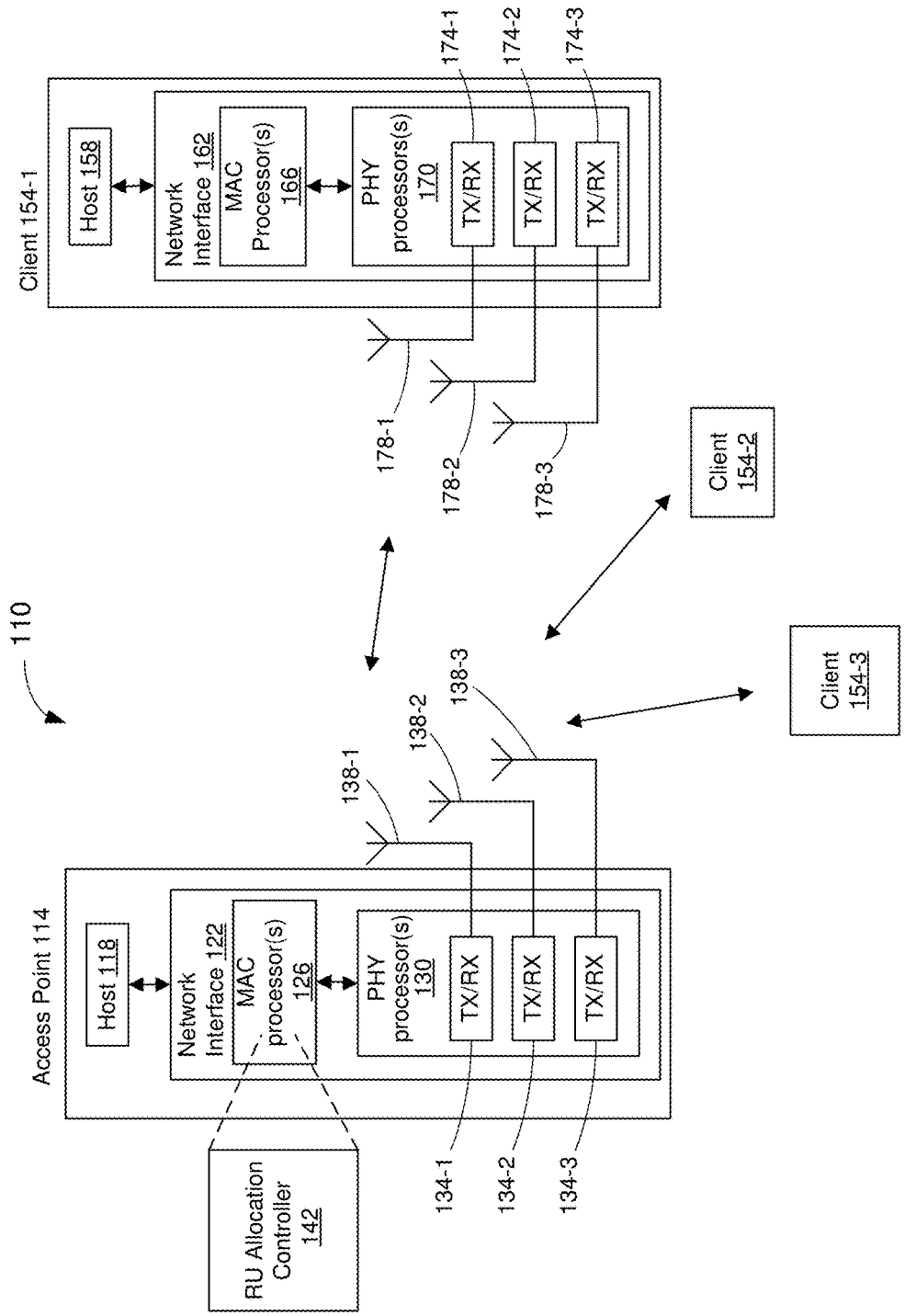
FIG. 1 is a block diagram of an example communication system in which an access point (AP) allocates frequency resource units (RUs) for multi-user (MU) communications in channels having bandwidths greater than 160 MHz, according to an embodiment.

FIG. 1 is a diagram of an example WLAN 110 that uses communication channels wider than 160 MHz, according to an embodiment. The WLAN 110 includes an AP 114 that comprises a host processor 118 coupled to a wireless network interface device 122. The wireless network interface device 122 includes one or more medium access control (MAC) processors 126 (sometimes referred to herein as "the MAC processor 126" for brevity) and one or more PHY processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the wireless network interface device 122 is configured for operation within a single RF band at a given time. In an embodiment, the wireless network interface device 122 is configured to transmit and receive via a communication channel that spans a bandwidth greater than 160 MHz, the communication channel within a single RF band. In another embodiment, the wireless network interface device 122 is additionally configured for operation within two or more RF bands at the same time or at different times. For example, in an embodiment, the wireless network interface device 122 includes multiple PHY processors 130, where respective PHY processors 130 correspond to respective RF bands. In another embodiment, the wireless network interface device 122 includes a single PHY processor 130, where each transceiver 134 includes respective RF radios corresponding to respective RF bands. In an embodiment, the wireless network interface device 122 is configured to transmit and receive via a communication channel that spans a bandwidth greater than 160 MHz, the communication channel spanning multiple RF bands.

The wireless network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. The first IC and the second IC may be packaged together in a single IC package thereby forming a modular device, or the first IC and the second IC may be coupled together on a single printed board, for example, in various embodiments. As another example, at least a portion of the MAC processor 126 and at least a portion of the PHY processor 130 may be implemented on a single IC. For instance, the wireless network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the wireless network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and to encapsulate the MAC layer data units to generate PHY data units such as PHY protocol data units (PPDUs) for transmission via the antennas 138. Similarly, the PHY processor 130 may be configured to receive PHY data units that were received via the antennas 138, and to extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more RF signals for transmission, the PHY processor 130 is configured to process (which may include modulation, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulation, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., in various embodiments.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In other embodiments, the MAC processor 126 additionally or alternatively includes one or more hardware state machines.

The MAC processor 126 includes, or implements, an RU allocation controller 142. The RU allocation controller 142 determines an allocation of RUs within a communication channel for multi-user (MU) communications, such as for a downlink (DL) MU transmission by the AP 114 to multiple client stations, or an uplink (UL) MU transmission by multiple client stations to the AP 114. In some embodiments, the RU allocation controller 142 generates RU allocation information to be included in packet for transmission to multiple client stations, such as in a PHY header of a DL MU PPDU, or in a trigger frame configured to prompt an MU transmission by multiple client stations.

In an embodiment, the RU allocation controller 142 is implemented by a processor executing machine readable instructions stored in a memory, where the machine readable instructions cause the processor to perform acts described in more detail below. In another embodiment, the RU allocation controller 142 additionally or alternatively comprises one or more hardware state machines that are configured to perform acts described in more detail below.

The WLAN 110 also includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a wireless network interface device 162. The wireless network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

In an embodiment, the wireless network interface device 162 is configured for operation within a single RF band at a given time. In another embodiment, the wireless network interface device 162 is configured for operation within two or more RF bands at the same time or at different times. For example, in an embodiment, the wireless network interface device 162 includes multiple PHY processors 170, where respective PHY processors 170 correspond to respective RF bands. In another embodiment, the wireless network interface device 162 includes a single PHY processor 170, where each transceiver 174 includes respective RF radios corresponding to respective RF bands. In an embodiment, the wireless network interface device 162 includes multiple MAC processors 166, where respective MAC processors 166 correspond to respective RF bands. In another embodiment, the wireless network interface device 162 includes a single MAC processor 166 corresponding to the multiple RF bands.

The wireless network interface device 162 is implemented using one or more ICs configured to operate as discussed below. For example, the MAC processor 166 may be implemented on at least a first IC, and the PHY processor 170 may be implemented on at least a second IC. The first IC and the second IC may be packaged together in a single IC package thereby forming a modular device, or the first IC and the second IC may be coupled together on a single printed board, for example, in various embodiments. As another example, at least a portion of the MAC processor 166 and at least a portion of the PHY processor 170 may be implemented on a single IC. For instance, the wireless network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the wireless network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
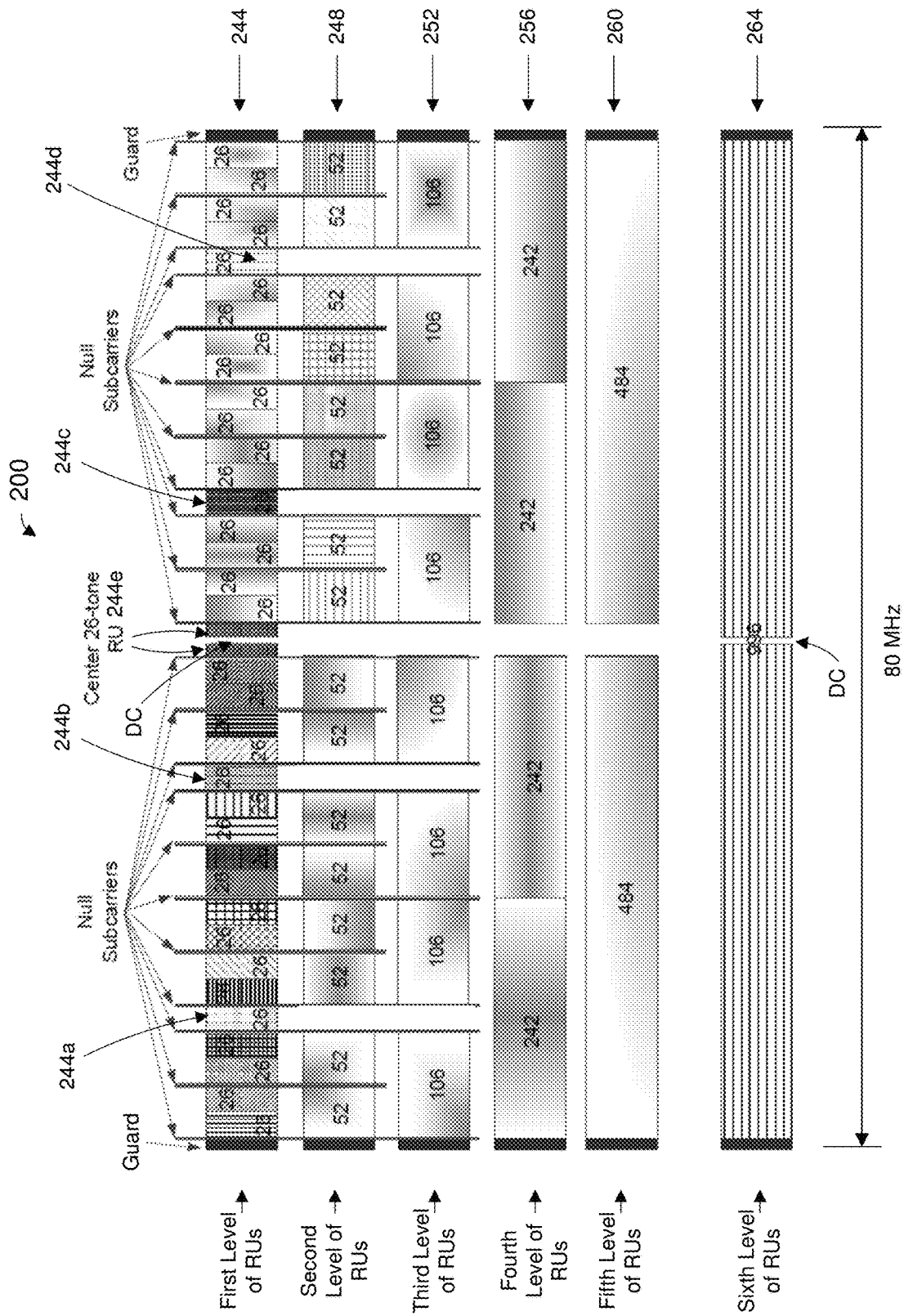
FIG. 2 is a diagram of an example set of frequency RUs that can be allocated for an MU transmission in a communication channel having a bandwidth no more than 160 MHz, according to an embodiment.

FIG. 2 is a diagram of an example set 200 of frequency RUs (sometimes referred to herein as "RUs" for brevity) that can be allocated for an MU transmission in a communication channel having a bandwidth no more than 160 MHz, according to an embodiment. The set 200 of RUs corresponds to a hierarchy or RUs corresponding to different bandwidths. In an embodiment, the communication system 110 of FIG. 1 is configured to use the set 200 when selecting RUs for an MU transmission. For example, the RU allocation controller 142 is configured to select RUs from the set 200 when allocating RUs for an MU transmission in a communication channel that spans 80 MHz.

The set 200 (corresponding to a hierarchy) includes a plurality of levels of RUs including: a first level of RUs 244 (referred to as 26-tone RUs), a second level of RUs 248 (referred to as 52-tone RUs), a third level of RUs 252 (referred to as 106-tone RUs), a fourth level of RUs 256 (referred to as 242-tone RUs), a fifth level of RUs 260 (referred to as 484-tone RUs), and a sixth level of RUs 264 (referred to as 996-tone RUs). The number of "tones" in each RU refers to a number of orthogonal frequency division multiplexing (OFDM) subcarriers or "tones" in the RU. The 26-tone RUs 244 correspond to a bandwidth of approximately 2.2 MHz. The 52-tone RUs 248 correspond to a bandwidth of approximately 4.4 MHz. The 106-tone RUs 252 correspond to a bandwidth of approximately 8.8 MHz. The 242-tone RUs 256 correspond to a bandwidth of approximately 20 MHz. The 484-tone RUs 260 correspond to a bandwidth of approximately 40 MHz. The 996-tone RU 264 corresponds to a bandwidth of approximately 80 MHz. In other embodiments, a set with RUs of different bandwidths and/or numbers of tones are utilized.

In the example set 200 of FIG. 2, each of the second through sixth levels includes one or more RUs having a frequency bandwidth that is greater than a frequency bandwidth of each RU in the level below. For example, each RU 248 in the second level has a frequency bandwidth approximately double a frequency bandwidth of each RU 244 in the first level. Additionally, each RU in each of the second through sixth levels covers (or overlaps with) a plurality of RUs in the level below. For example, each RU 248 in the second level covers (or overlaps with) a corresponding pair of RUs 244 in the first level.

The first level includes a first set of RUs 244 that are covered by RUs 248 in the second level, and a second set of RUs 244 that are not covered by any RUs 248 in the second level. For example, RUs 244a, 244b, 244c, 244d, and 244e are not by any RUs 248 in the second level. In an embodiment, the RU 244e comprises two portions separated in frequency by a plurality of direct current (DC) tones.

When allocating RUs for a communication channel that spans 80 MHz, the RU controller 142 selects RUs from the set 200, according to an embodiment. When allocating RUs for a communication channel that spans 160 MHz, the RU controller 142 selects RUs for a first 80 MHz segment of the communication channel from the set 200, and selects RUs for a second 80 MHz segment of the communication channel from the set 200, according to an embodiment.

Figure 3:
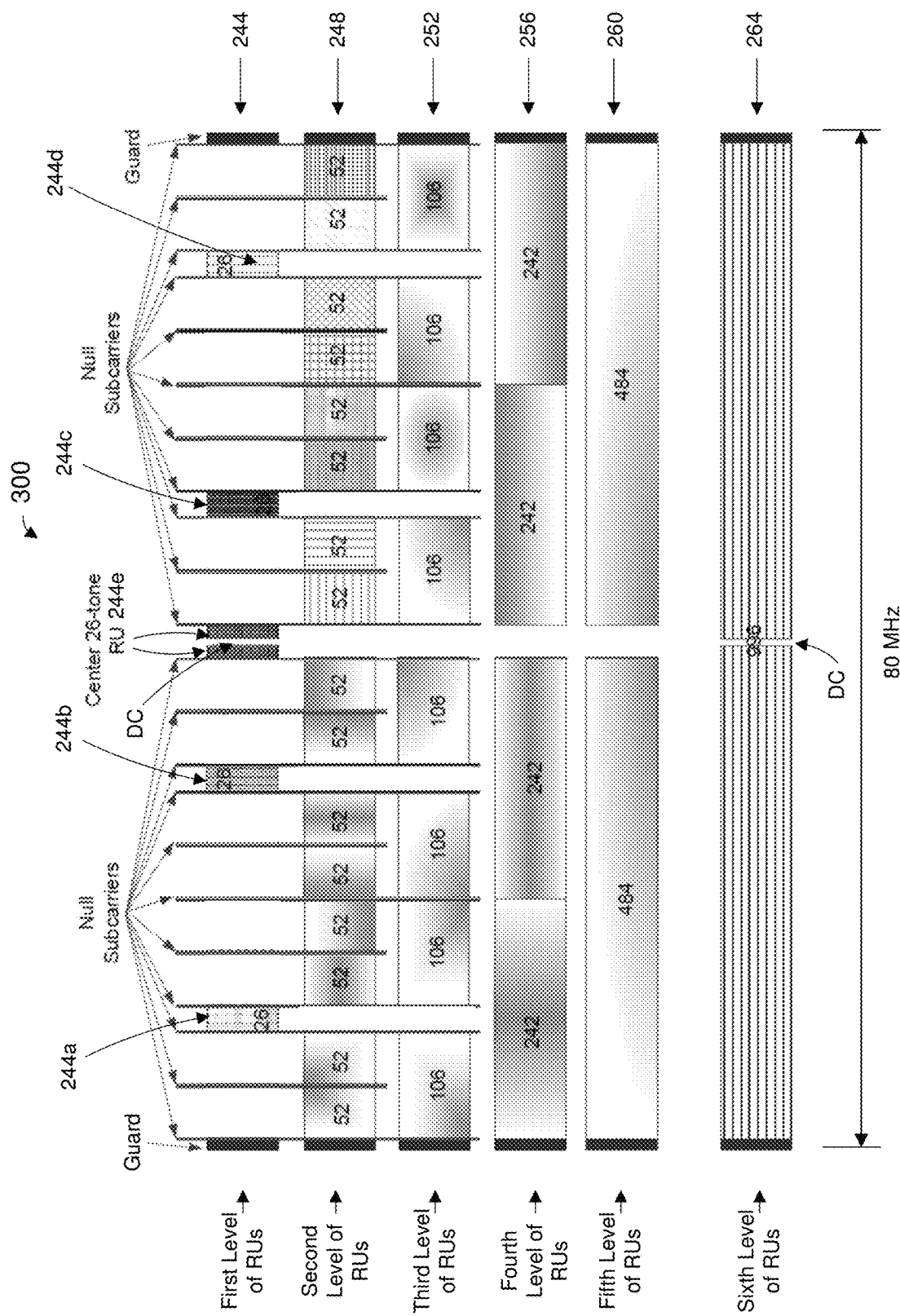
FIG. 3 is a diagram of an example set of RUs that can be allocated for an MU transmission in a communication channel that spans more than 160 MHz, according to an embodiment.

FIG. 3 is a diagram of an example set 300 of RUs that can be allocated for an MU transmission in a communication channel that spans more than 160 MHz, according to an embodiment. The set 300 of RUs corresponds to a hierarchy or RUs corresponding to different bandwidths. In an embodiment, the communication system 110 of FIG. 1 is configured to use the set 300 when selecting RUs for an MU transmission in a communication channel that spans more than 160 MHz. For example, the RU allocation controller 142 is configured to select RUs from the set 300 when allocating RUs for an MU transmission in a communication channel that spans more than 160 MHz, according to an embodiment. For instance, the RU controller 142 selects RUs for each 80 MHz segment of the communication channel from the set 300, according to an embodiment.

The set 300 is similar to the set 200 of FIG. 2, and like-numbered elements are not described in detail for purposes of brevity. As compared to the set 200, the set 300 does not include RUs 244 that are covered by RUs 248 in the second level. In other words, any RUs 244 that are covered by any RUs 248 cannot be allocated for an MU transmission in a communication channel that spans more than 160 MHz.

The first level in the hierarchy 300 includes significantly less RUs 244 as compared to the first level in the hierarchy 200. As a result, a number of possible combinations of RUs selected from the hierarchy 300 is significantly less than a number of possible combinations of RUs selected from the hierarchy 200, and thus a number of bits required to indicate an allocation of RUs from the hierarchy 300 is significantly less than a number of bits required to indicate an allocation of RUs from the hierarchy 200.

Although the example set 300 includes five 26-tone RUs (e.g., RUs 244a, 244b, 244c, 244d, and 244e), other example hierarchies include other suitable numbers of 26-tone RUs that are not covered by a 52-tone RUs, in other embodiments. For example, another example set includes only one 26-tone RU in each of two 40 MHz segments in the hierarch, according to an example embodiment. For example, one example set includes only the 26-tone RU 244a and the 26-tone RU 244c, according to an embodiment. As another example, another example set includes only the 26-tone RU 244b and the 26-tone RU 244d, according to an embodiment.

Figure 4:
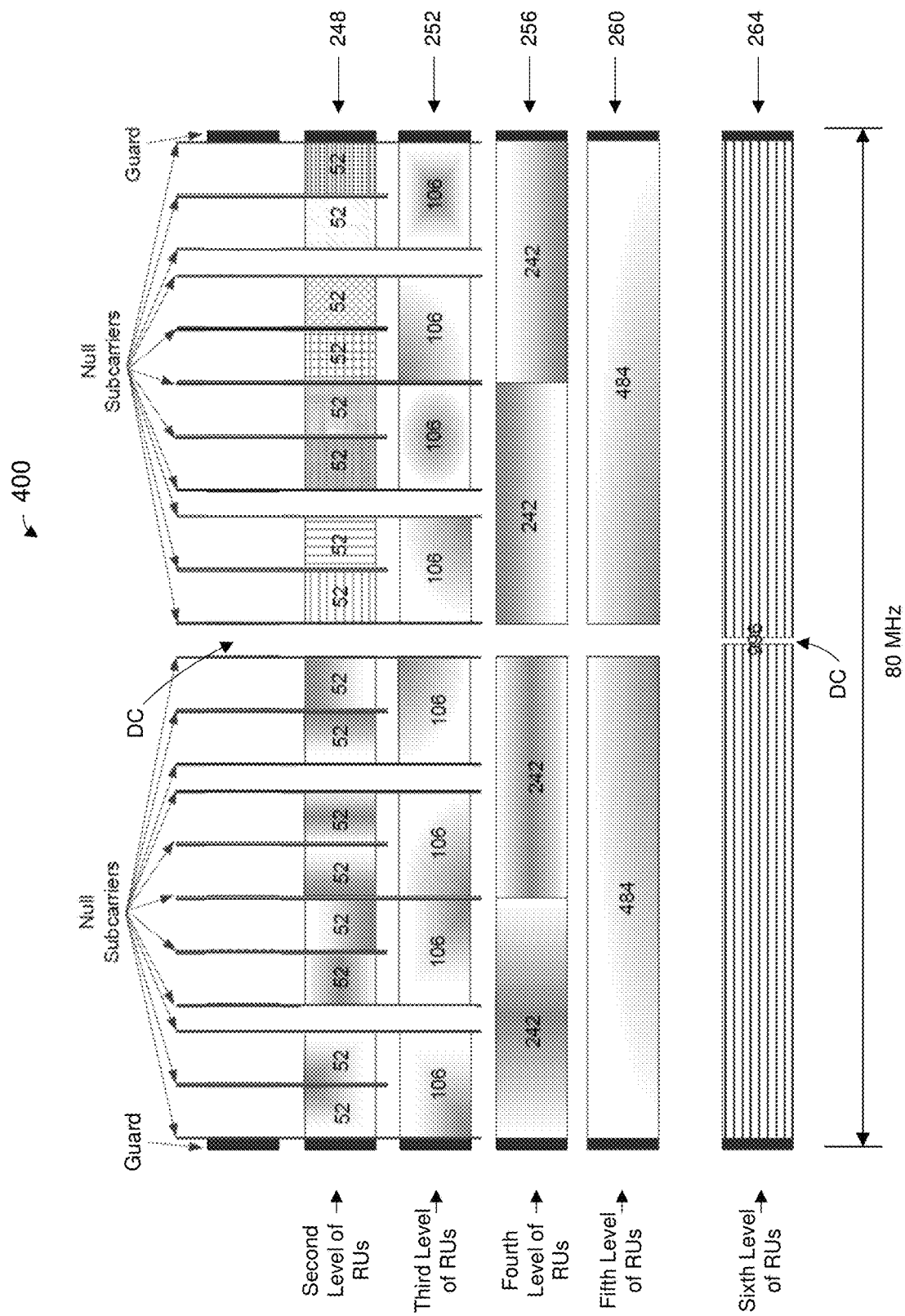
FIG. 4 is a diagram of another example set of RUs that can be allocated for an MU transmission in a communication channel that spans more than 160 MHz, according to another embodiment.

FIG. 4 is a diagram of another example set 400 of RUs that can be allocated for an MU transmission in a communication channel that spans more than 160 MHz, according to another embodiment. The set 400 of RUs corresponds to a hierarchy or RUs corresponding to different bandwidths. In an embodiment, the communication system 110 of FIG. 1 is configured to use the set 400 when selecting RUs for an MU transmission in a communication channel that spans more than 160 MHz. For example, the RU allocation controller 142 is configured to select RUs from the set 400 when allocating RUs for an MU transmission in a communication channel that spans more than 160 MHz, according to an embodiment. For instance, the RU controller 142 selects RUs for each 80 MHz segment of the communication channel from the set 400, according to an embodiment.

The set 300 (corresponding to a hierarchy) is similar to the set 200 of FIG. 2, and like-numbered elements are not described in detail for purposes of brevity. As compared to the set 200, the set 400 does not include any RUs 244 in the first level. In other words, no RUs 244 can be allocated for an MU transmission in a communication channel that spans more than 160 MHz.

Because the set 400 does not include any RUs 244 from the set 200 (FIG. 2), a number of possible combinations of RUs selected from the set 400 is significantly less than a number of possible combinations of RUs selected from the set 200, and thus a number of bits required to indicate an allocation of RUs from the set 400 is significantly less than a number of bits required to indicate an allocation of RUs from the set 200.

Figure 5:
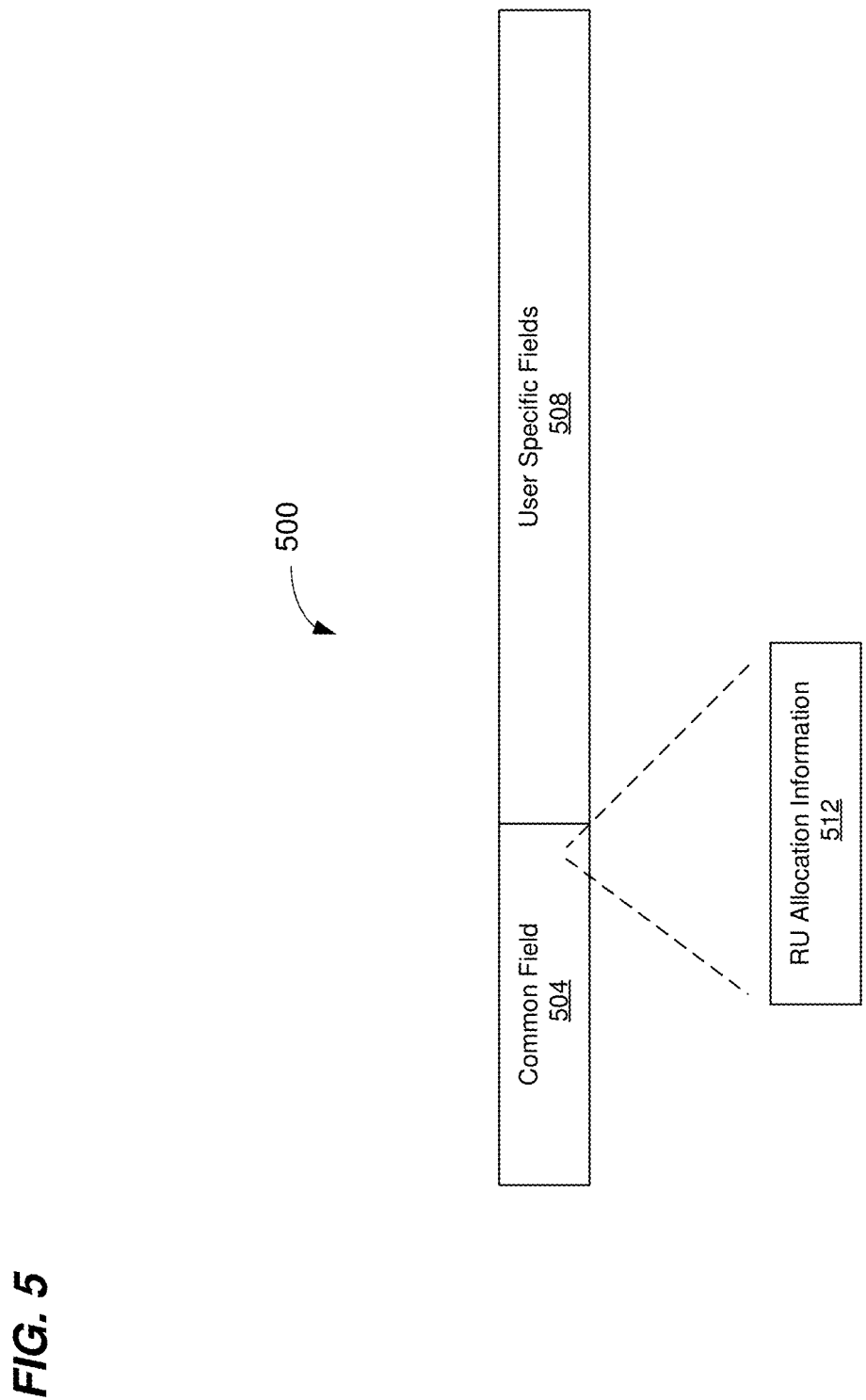
FIG. 5 is a diagram of an example signal field that is included in a physical layer (PHY) header of a DL MU packet, according to an embodiment.

FIG. 5 is a diagram of an example signal field 500 that is included in a PHY header of a DL MU packet, according to an embodiment. In an embodiment, the network interface 122 is configured to generate a DL MU packet having the signal field 500 in a PHY header of the MU packet.

The signal field 500 includes information for intended receivers of the DL MU packet to properly decode respective information streams in the DL MU packet. The signal field 500 includes a common field 504 that includes information common to all intended receivers of the DL MU packet. The signal field 500 also includes a plurality 508 of user specific fields. In an embodiment, each user specific field 500 includes information intended for a respective intended receiver.

In an embodiment, the common field 504 includes RU allocation information 512 that indicates an allocation of RUs in a PHY data portion of the DL MU packet.

In some embodiments, the signal field 500 is a first signal field (a SIG-B field) of the PHY header, and the PHY header is generated to include a second signal field (a SIG-A field). In some embodiments, the second signal field (SIG-A) is generated to include a bandwidth subfield that indicates a bandwidth of the DL MU packet. In some embodiments, when the DL MU packet is to be transmitted in bandwidth greater than 160 MHz, the second signal field (SIG-A) is generated to indicate whether the bandwidth is 160+20 MHz, 160+40 MHz, 160+80 MHz, or 320 MHz.

Figure 6:
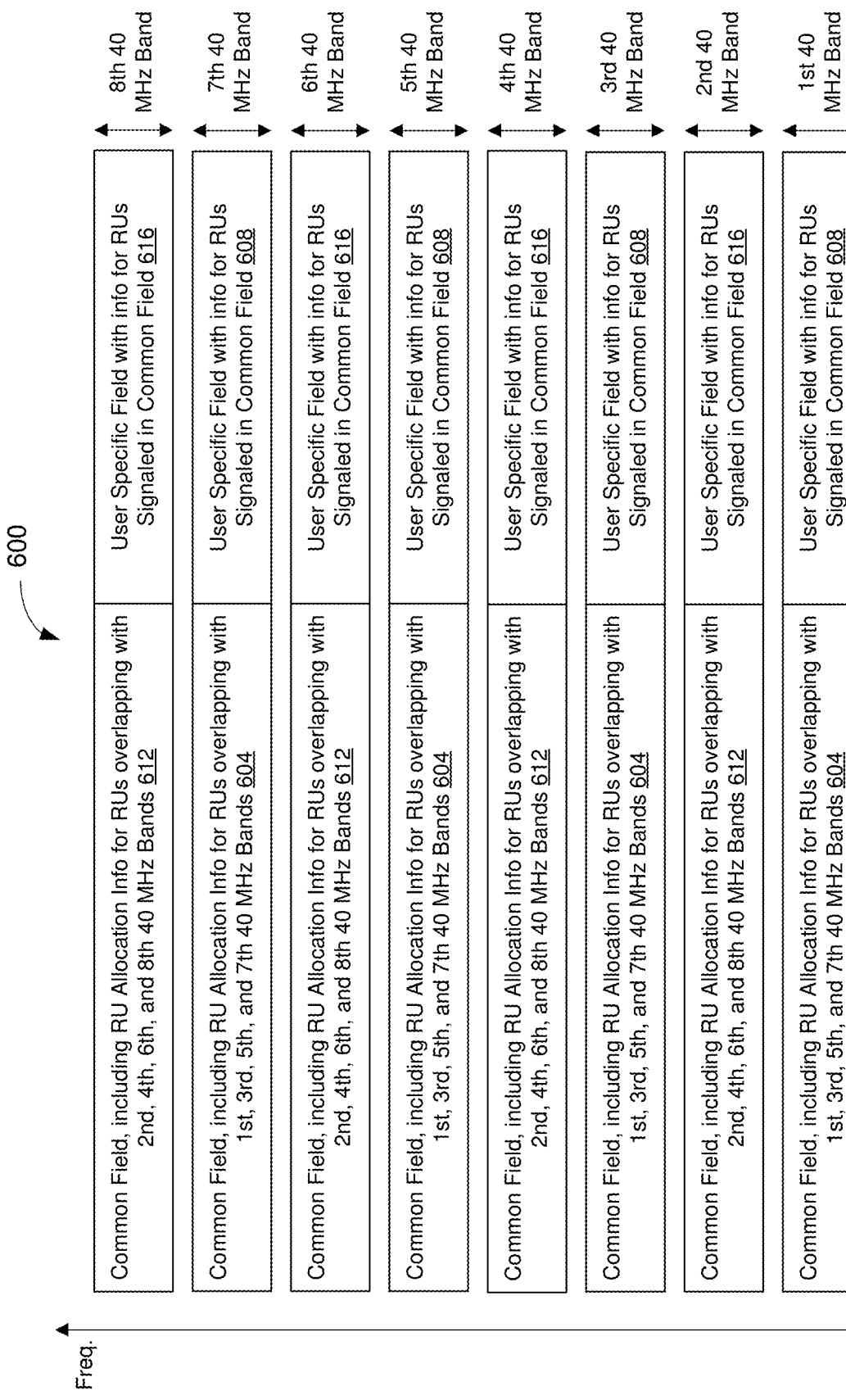
FIG. 6 is a diagram showing an example signal field that is included in a PHY header of a DL MU packet that spans 320 MHz, according to an embodiment.

FIG. 6 is a diagram showing an example signal field 600 that is included in a PHY header of a DL MU packet that spans 320 MHz, according to an embodiment. In an embodiment, the network interface 122 is configured to generate a DL MU packet having the signal field 600 in a PHY header of the MU packet.

In an embodiment, the signal field 600 includes different information in different frequency segments. For example, a first portion 604 of a common field (e.g., the common field 504 of FIG. 5) is included in a first 40 MHz band, a third 40 MHz band, a fifth 40 MHz band, and a seventh 40 MHz band. Additionally, a first portion 608 of a user specific field (e.g., the user specific field 508 of FIG. 5) is included in the first 40 MHz band, the third 40 MHz band, the fifth 40 MHz band, and the seventh 40 MHz band. Similarly, a second portion 612 of the common field is included in a second 40 MHz band, a fourth 40 MHz band, a sixth 40 MHz band, and an eighth 40 MHz band. A second portion 616 of the user specific field is included in the second 40 MHz band, the fourth 40 MHz band, the sixth 40 MHz band, and the eighth 40 MHz band.

The first portion 604 of the common field includes RU allocation information for RUs that overlap any of the first 40 MHz band, the third 40 MHz band, the fifth 40 MHz band, or the seventh 40 MHz band. The first portion 608 of the user specific field includes user specific information for any RUs signaled in the first portion 604 of the common field. Similarly, the second portion 612 of the common field includes RU allocation information for RUs that overlap any of the second 40 MHz band, the fourth 40 MHz band, the sixth 40 MHz band, or the eighth 40 MHz band, and the second portion 616 of the user specific field includes user specific information for any RUs signaled in the second portion 612 of the common field.

In an embodiment, each instance of the first portion 604 of the common field and each instance of the second portion 612 of the common field spans a respective 40 MHz band. Similarly, each instance of the first portion 608 of the user specific field and each instance of the second portion 616 of the user specific field spans a respective 40 MHz band, according to an embodiment.

In another embodiment, each instance of the first portion 604 of the common field and each instance of the second portion 612 of the common field spans a 20 MHz band, and two instances of each of the first portion 604 of the common field and two instances of each of the second portion 612 of the common field are included in a respective 40 MHz band. Similarly, each instance of the first portion 608 of the user specific field and each instance of the second portion 616 of the user specific field spans a 20 MHz band, and two instances of each of the first portion 608 of the user specific field and two instances of each of the second portion 616 of the common field are included in a respective 40 MHz band.

FIG. 6 illustrates the example signal field 600 spanning 320 MHz. If the signal field 600 spanned a narrower bandwidth, then one or more instances of the first portion 604 of the common field and one or more instances of the first portion 608 of the user specific field, and/or one or more instances of the second portion 612 of the common field and one or more instances of the second portion 616 of the user specific field are not transmitted in one or more of the 40 MHz bands. For example, for a 160 MHz+80 MHz channel, instances of the first portion 608, the first portion 608, the second portion 612, and the second portion 616 are not transmitted in the seventh and eighth 40 MHz bands. As another example, for a 160 MHz+40 MHz channel or a 160 MHz+40 MHz channel, instances of the first portion 608, the first portion 608, the second portion 612, and the second portion 616 are not transmitted in the sixth, seventh, and eighth 40 MHz bands.

In an embodiment, the portion 604/612 of the common field includes a suitable set of bits (e.g., eight bits, or another suitable number of bits) of RU allocation information for each 40 MHz band signaled by the portion 604/612 of the common field.

Figure 7:
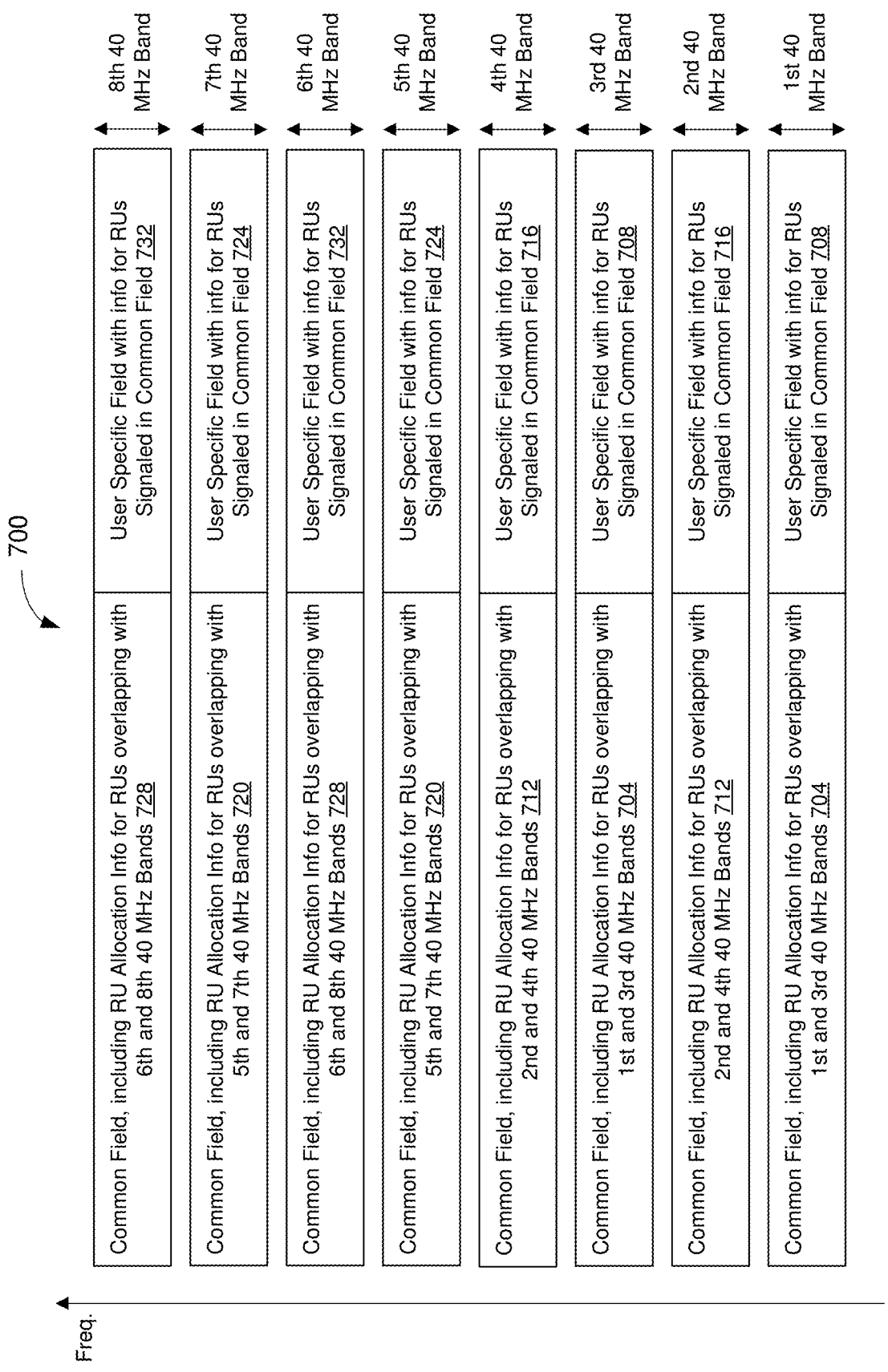
FIG. 7 is a diagram showing another example signal field that is included in a PHY header of a DL MU packet that spans 320 MHz, according to another embodiment.

FIG. 7 is a diagram showing another example signal field 700 that is included in a PHY header of a DL MU packet that spans 320 MHz, according to another embodiment. In an embodiment, the network interface 122 is configured to generate a DL MU packet having the signal field 700 in a PHY header of the MU packet.

In an embodiment, the signal field 700 includes different information in different frequency segments. For example, a first portion 704 of a common field (e.g., the common field 504 of FIG. 5) is included in a first 40 MHz band and a third 40 MHz band. Additionally, a first portion 708 of a user specific field (e.g., the user specific field 508 of FIG. 5) is included in the first 40 MHz band and the third 40 MHz band. Similarly, a second portion 712 of the common field is included in a second 40 MHz band and a fourth 40 MHz band. A second portion 716 of the user specific field is included in the second 40 MHz band and the fourth 40 MHz band. A third portion 720 of the common field is included in a fifth 40 MHz band and a seventh 40 MHz band. A third portion 724 of the user specific field is included in the fifth 40 MHz band and the seventh 40 MHz band. A fourth portion 728 of the common field is included in a sixth 40 MHz band and an eighth 40 MHz band. A fourth portion 732 of the user specific field is included in the sixth 40 MHz band and the eighth 40 MHz band.

The first portion 704 of the common field includes RU allocation information for RUs that overlap either of the first 40 MHz band or the third 40 MHz band. The first portion 708 of the user specific field includes user specific information for any RUs signaled in the first portion 704 of the common field. Similarly, the second portion 712 of the common field includes RU allocation information for RUs that overlap either of the second 40 MHz band or the fourth 40 MHz band, and the second portion 716 of the user specific field includes user specific information for any RUs signaled in the second portion 712 of the common field. The third portion 720 of the common field includes RU allocation information for RUs that overlap either of the fifth 40 MHz band or the seventh 40 MHz band, and the third portion 724 of the user specific field includes user specific information for any RUs signaled in the second portion 720 of the common field. The fourth portion 728 of the common field includes RU allocation information for RUs that overlap either of the sixth 40 MHz band or the eighth 40 MHz band, and the fourth portion 732 of the user specific field includes user specific information for any RUs signaled in the fourth portion 728 of the common field.

In an embodiment, each instance of the first portion 704 of the common field, each instance of the second portion 712 of the common field, each instance of the third portion 720 of the common field, and each instance of the fourth portion 728 of the common field spans a respective 40 MHz band. Similarly, each instance of the first portion 708 of the user specific field, each instance of the second portion 716 of the user specific field, each instance of the third portion 724 of the user specific field, and each instance of the fourth portion 732 of the user specific field spans a respective 40 MHz band, according to an embodiment.

In another embodiment, each instance of the first portion 704 of the common field, each instance of the second portion 712 of the common field, each instance of the third portion 720 of the common field, and each instance of the fourth portion 728 of the common field spans a 20 MHz band, and two instances of each the first portion 704 of the common field, the second portion 712 of the common field, the third portion 720 of the common field, and the fourth portion 728 of the common field are included in a respective 40 MHz band. Similarly, each instance of the first portion 708 of the user specific field, each instance of the second portion 716 of the user specific field, each instance of the third portion 724 of the user specific field, and each instance of the fourth portion 732 of the user specific field spans a 20 MHz band, and two instances of each of the first portion 708 of the user specific field, the second portion 716 of the user specific field, the third portion 724 of the user specific field, and the fourth portion 732 of the user specific field are included in a respective 40 MHz band.

FIG. 7 illustrates the example signal field 700 spanning 320 MHz. If the signal field 700 spanned a narrower bandwidth, then one or more instances of the third portion 720 of the common field and one or more instances of the third portion 724 of the user specific field, and/or one or more instances of the fourth portion 728 of the common field and one or more instances of the fourth portion 732 of the user specific field are not transmitted in one or more of the 40 MHz bands. For example, for a 160 MHz+80 MHz channel, instances of the third portion 720, the third portion 724, the fourth portion 728, and the fourth portion 732 are not transmitted in the seventh and eighth 40 MHz bands. As another example, for a 160 MHz+40 MHz channel or a 160 MHz+40 MHz channel, instances of the third portion 720, the third portion 724, the fourth portion 728, and the fourth portion 732 are not transmitted in the sixth, seventh, and eighth 40 MHz bands.

In an embodiment, the portion 704/712/720/728 of the common field includes a suitable set of bits (e.g., eight bits, or another suitable number of bits) of RU allocation information for each 40 MHz band signaled by the portion 704/712/720/728 of the common field.

FIGS. 8A-C illustrate a table (Table 1) corresponding to an example encoding of allocation information for a 40 MHz band within a communication channel spanning a bandwidth greater than 160 MHz, according to an embodiment. The allocation information in Table 1 corresponds to allocation of RUs that overlap with the 40 MHz band, according to an embodiment. The encoding of allocation information according to Table 1 does not permit allocation of 26-tone RUs, according to an embodiment. In an embodiment, the encoding of allocation information according to Table 1 is used with the example set 400 of FIG. 4. In other embodiments, the encoding of allocation information according to Table 1 is used with another suitable set of RUs.

The left-hand column in Table 1 is an 8-bit encoding of allocation information that indicates the allocation specified in columns labeled #1 to #8, which generally correspond to respective 52-tone RUs within the 40 MHz band, increasing in frequency. The term $y_2y_1y_0$ corresponds to an allocation of a 242-tone RU, and in particular a number of client stations (from one to eight) that are allocated to the 242-tone RU. For example, multiple client stations may be allocated to a single 242-tone RU for a multi-user multiple input, multiple output (MU-MIMO) allocation. The term $y_1y_0z_1z_0$ corresponds to an allocation of two 242-tone RUs, and in particular a first number of client stations ($y_1y_0$, from one to four) that are allocated to a first 242-tone RU and a second number of client stations ($z_1z_0$, from one to four) that are allocated to a second 242-tone RU, e.g., when MU-MIMO is to be used. The term $y_3y_2y_1y_0$ corresponds to an allocation of a 484-tone RU, a 996-tone RU, or a 2×996-tone RU that overlaps the 40 MHz band, and in particular a number of client stations (from one to sixteen) that are allocated to the RU, e.g., when MU-MIMO is to be used.

To indicate allocation of RUs greater than 160 MHz such as 160 MHz+20 MHz (2*996-tone+242-tone), 160 MHz+40 MHz (2*996-tone+484-tone), 160 MHz+80 MHz (2*996-tone+996-tone), or 320 MHz (4*996-tone), reserved values in Table 1 are used, according to an embodiment.

The allocation encoding of Table 1 assumes that MU MIMO is allowed only in RUs wider than 106 tones (e.g., in RUs greater than or equal 242 tones). In other embodiments, MU-MIMO is also allowed in 106-tone RUs, and Table 1 is suitably modified accordingly.

The allocation encoding of Table 1 assumes a maximum of eight spatial streams can be allocated to a single RU. In other embodiments, a maximum of sixteen spatial streams can be allocated to a single RU, and Table 1 is suitably modified accordingly. In some embodiments that permit a maximum of sixteen spatial streams to be allocated to a single RU, sixteen spatial streams is only permitted for RUs with at least 484 tones.

FIGS. 9A-B illustrate a table (Table 2) corresponding to another example encoding of allocation information for a 40 MHz band within a communication channel spanning a bandwidth greater than 160 MHz, according to another embodiment. The allocation information in Table 2 corresponds to allocation of RUs that overlap with the 40 MHz band, according to an embodiment. The encoding of allocation information according to Table 2 does not permit allocation of 26-tone RUs that are covered by any 52-tone RUs, according to an embodiment. In an embodiment, the encoding of allocation information according to Table 2 is used with the example set 300 of FIG. 3. In other embodiments, the encoding of allocation information according to Table 2 is used with another suitable set of RUs.

The left-hand column in Table 2 is an 8-bit encoding of allocation information that indicates the allocation specified in columns labeled #1 to #9. The columns #1 to #4 and #6 to #9 generally correspond to respective 52-tone RUs within the 40 MHz band, increasing in frequency. Column #5 corresponds to a 26-RU that is not covered by an 52-RUs in a hierarch of RUs (e.g., the same as or similar to the set 300 of FIG. 3).

The term $y_2y_1y_0$ corresponds to an allocation of a 242-tone RU, a 484-tone RU, a 996-tone RU, or a 2*996 tone RU, and in particular a number of client stations (from one to eight) that are allocated to the RU. For example, multiple client stations may be allocated to a single RU for an MU-MIMO allocation. The term $y_2y_1y_0z_2z_1z_0$ corresponds to an allocation of two 242-tone RUs, and in particular a first number of client stations ($y_2y_1y_0$, from one to eight) that are allocated to a first 242-tone RU and a second number of client stations ($z_2z_1z_0$, from one to eight) that are allocated to a second 242-tone RU, e.g., when MU-MIMO is to be used.

To indicate allocation of RUs greater than 160 MHz such as 160 MHz+20 MHz (2*996-tone+242-tone), 160 MHz+40 MHz (2*996-tone+484-tone), 160 MHz+80 MHz (2*996-tone+996-tone), or 320 MHz (4*996-tone), reserved values in Table 2 are used, according to an embodiment.

The allocation encoding of Table 2 assumes that MU MIMO is allowed only in RUs wider than 106 tones (e.g., in RUs greater than or equal 242 tones). In other embodiments, MU-MIMO is also allowed in 106-tone RUs, and Table 2 is suitably modified accordingly.

The allocation encoding of Table 2 assumes a maximum of eight spatial streams can be allocated to a single RU. In other embodiments, a maximum of sixteen spatial streams can be allocated to a single RU, and Table 2 is suitably modified accordingly. In some embodiments that permit a maximum of sixteen spatial streams to be allocated to a single RU, sixteen spatial streams is only permitted for RUs with at least 484 tones.

In the embodiments described above with reference to FIGS. 6-9B, different portions of a signal field (e.g., the signal field 500 or another suitable signal field) include RU allocation information for RUs that overlap one or more 40 MHz bands of a communication channel. In other embodiments, different portions of a signal field (e.g., the signal field 500 or another suitable signal field) include RU allocation information for RUs that overlap one or more 20 MHz bands of a communication channel.

FIGS. 10A-B illustrate a table (Table 3) corresponding to an example encoding of allocation information for a 20 MHz band within a communication channel spanning a bandwidth greater than 160 MHz, according to an embodiment. The allocation information in Table 3 corresponds to allocation of RUs that overlap with the 20 MHz band, according to an embodiment. The encoding of allocation information according to Table 3 does not permit allocation of any 26-tone RUs, according to an embodiment. In an embodiment, the encoding of allocation information according to Table 3 is used with the example set 400 of FIG. 4. In other embodiments, the encoding of allocation information according to Table 3 is used with another suitable set of RUs.

The left-hand column in Table 3 is an 8-bit encoding of allocation information that indicates the allocation specified in columns labeled #1 to #4. The columns #1 to #4 generally correspond to respective 52-tone RUs within the 40 MHz band, increasing in frequency.

The term $y_3y_2y_1y_0$ corresponds to an allocation of a 242-tone RU, a 484-tone RU, a 996-tone RU, or a 2*996 tone RU, a 4*996 tone RU, a 2*996 tone+242-tone RU, a 2*996 tone+484-tone RU, a 2*996 tone+996-tone RU, and in particular a number of client stations (from one to sixteen) that are allocated to the RU. For example, multiple client stations may be allocated to a single RU for an MU-MIMO allocation.

The allocation encoding of Table 3 assumes that MU MIMO is allowed only in RUs wider than 106 tones (e.g., in RUs greater than or equal 242 tones). In other embodiments, MU-MIMO is also allowed in 106-tone RUs, and Table 3 is suitably modified accordingly.

The allocation encoding of Table 3 assumes a maximum of sixteen spatial streams can be allocated to a single RU. In other embodiments, a maximum of eight spatial streams can be allocated to a single RU, and Table 3 is suitably modified accordingly. In some embodiments, sixteen spatial streams is only permitted for RUs with at least 484 tones.

Although the allocation of RUs was described above in the context of DL MU transmissions, the allocation of RUs for an uplink (UL) MU transmission use similar techniques, according to some embodiments.

Figure 11:
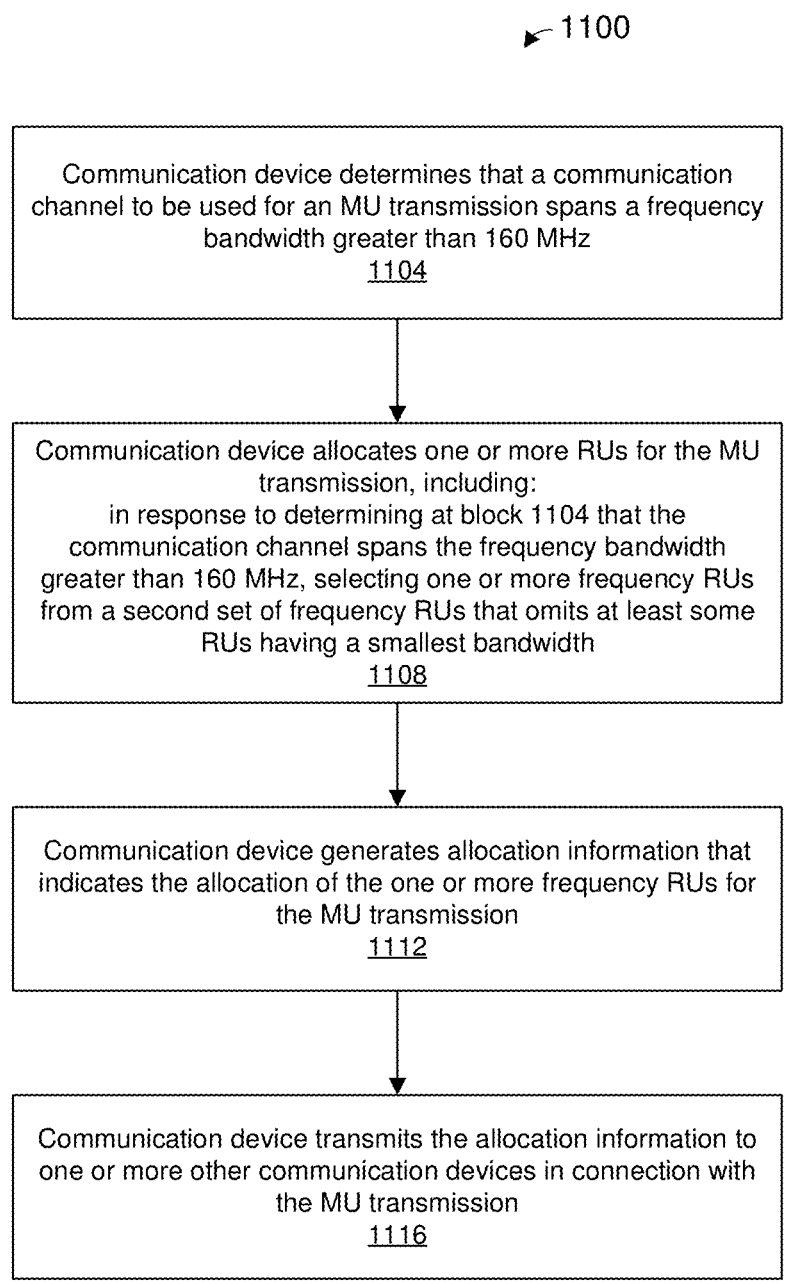
FIG. 11 is a flow diagram of an example method for allocating frequency resources for an MU communication in a WLAN, according to an embodiment.

FIG. 11 is a flow diagram of an example method 1100 for allocating frequency resources for an MU communication in a WLAN, according to an embodiment. In some embodiments, the method 1100 is performed in connection with a communication protocol that defines a first set of RUs of different bandwidths for use with communication channels spanning at most 160 MHz and a second set of RUs for use with communication channels spanning more than 160 MHz. The first set of frequency RUs includes at least a first subset of frequency RUs having a first bandwidth and a second set of RUs having a second bandwidth greater than the first bandwidth, and wherein the second set of frequency RUs omits at least some of the frequency RUs in the first subset of frequency RUs of the first set of frequency RUs, according to an embodiment.

As an illustrative example, the first set of RUs corresponds to a set of RUs the same as or similar to the set of RUs illustrated in FIG. 2, and the second set of RUs corresponds to a set of RUs the same as or similar to the set of RUs illustrated in FIG. 3, according to an embodiment. As another illustrative example, the first set of RUs corresponds to a set of RUs the same as or similar to the set of RUs illustrated in FIG. 2, and the second set of RUs corresponds to a set of RUs the same as or similar to the set of RUs illustrated in FIG. 4, according to another embodiment. In other embodiments, other suitable first and second sets of RUs are utilized in connection with the method 1100.

In an embodiment, the second set of frequency RUs omits all of the frequency RUs in the first subset of frequency RUs of the first set of frequency RUs. In another embodiment, the second set of frequency RUs additionally or alternatively includes one or more frequency RUs having one or more respective frequency bandwidths greater than 160 MHz.

The method 1100 is implemented by a communication device having a structure the same as or similar to the AP 114 of FIG. 1, and the method 1100 is described with reference to FIG. 1 for ease of explanation. In other embodiments, however, the method 1100 is implemented by a communication device having a suitable structure different than the AP 114 of FIG. 1.

At block 1104, at a communication device determines (e.g., the network interface device 122 determines, the MAC processor 126 determines, the controller 142 determines, etc.) that a communication channel to be used for an MU transmission spans a frequency bandwidth greater than 160 MHz.

At block 1108, the communication device allocates (e.g., the network interface device 122 allocates, the MAC processor 126 allocates, the controller 142 allocates, etc.) one or more RUs for the MU transmission. In an embodiment, allocating RUs at block 1108 comprises: in response to determining that the communication channel spans the frequency bandwidth greater than 160 MHz, selecting one or more frequency RUs from the second set of frequency RUs.

At block 1112, the communication device generates (e.g., the network interface device 122 generates, the MAC processor 126 generates, the controller 142 generates, etc.) allocation information that indicates the allocation of the one or more frequency RUs for the MU transmission.

At block 1116, the communication device transmits (e.g., the network interface device 122 transmits, the PHY processor 130 transmits, etc.) the allocation information to one or more other communication devices in connection with the MU transmission.

In some embodiments, allocating the one or more frequency RUs for the MU transmission at block 1108 comprises allocating the one or more frequency RUs for DL MU packet to be transmitted by the communication device; generating a PHY header of the DL MU packet to include the allocation information that indicates the allocation of the one or more frequency RUs for the DL MU packet; and transmitting the allocation information to one or more other communication devices comprises transmitting the allocation information in the PHY header of the DL MU packet.

In some embodiments, generating the allocation information at block 1112 comprises generating respective sets of bits for respective 40 MHz bands of the communication channel, each set of bits including allocation information that indicates an allocation of one or more frequency RUs that overlap the corresponding 40 MHz band in frequency. In an illustrative embodiment, each set of bits consists of eight bits. In other embodiments, each set of bits consists of another suitable number of bits.

In other embodiments, generating the allocation information at block 1112 comprises generating respective sets of bits for respective 20 MHz bands of the communication channel, each set of bits including allocation information that indicates an allocation of one or more frequency RUs that overlap the corresponding 20 MHz band in frequency. In an illustrative embodiment, each set of bits consists of eight bits. In other embodiments, each set of bits consists of another suitable number of bits.

In some embodiments, generating the PHY header of the DL MU packet to include the allocation information comprises including the allocation information in a first signal field of the PHY header; and the method 1100 further comprises generating the PHY header to include a second signal field, the second signal field including a bandwidth subfield that indicates the DL MU packet spans the frequency bandwidth greater than 160 MHz.

In another embodiment, allocating the one or more frequency RUs for the MU transmission at block 1108 comprises allocating the one or more frequency RUs for an UL MU packet to be transmitted by the communication device; and transmitting the allocation information at block 1116 comprises transmitting the allocation information in a DL packet.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for allocating frequency resources for a multi-user (MU) communication in a wireless local area network (WLAN), wherein a communication protocol defines a first set of frequency resource units (RUs) of different bandwidths for use with communication channels spanning at most 160 MHz and a second set of frequency RUs for use with communication channels spanning more than 160 MHz, wherein the first set of frequency RUs includes at least a first subset of frequency RUs having a first bandwidth and a second subset of RUs having a second bandwidth greater than the first bandwidth, and wherein the second set of frequency RUs omits at least some of the frequency RUs in the first subset of frequency RUs of the first set of frequency RUs, the method comprising:
   determining, at a communication device, that a communication channel to be used for an MU transmission spans a frequency bandwidth greater than 160 MHz;
   allocating, at the communication device, one or more frequency RUs for the MU transmission, including:
      in response to determining that the communication channel spans the frequency bandwidth greater than 160 MHz, selecting one or more frequency RUs from the second set of frequency RUs;
   generating, at the communication device, allocation information that indicates the allocation of the one or more frequency RUs for the MU transmission;
   transmitting, by the communication device, the allocation information to one or more other communication devices in connection with the MU transmission.

2. The method of claim 1, wherein selecting one or more frequency RUs from the second set of frequency RUs comprises selecting one or more frequency RUs from a set of frequency RUs that omits all of the frequency RUs in the first subset of frequency RUs of the first set of frequency RUs.

3. The method of claim 1, wherein selecting one or more frequency RUs from the second set of frequency RUs comprises selecting one or more frequency RUs from a set of frequency RUs that includes one or more frequency RUs having one or more respective frequency bandwidths greater than 160 MHz.

4. The method of claim 1, wherein:
   allocating the one or more frequency RUs for the MU transmission comprises allocating the one or more frequency RUs for a downlink (DL) MU packet to be transmitted by the communication device;
   generating, at the communication device, a physical layer (PHY) header of the DL MU packet to include the allocation information that indicates the allocation of the one or more frequency RUs for the DL MU packet; and
   transmitting the allocation information to one or more other communication devices comprises transmitting the allocation information in the PHY header of the DL MU packet.

5. The method of claim 4, wherein:
   generating the allocation information comprises generating respective sets of bits for respective 40 MHz bands of the communication channel, each set of bits including allocation information that indicates an allocation of one or more frequency RUs that overlap the corresponding 40 MHz band in frequency.

6. The method of claim 5, wherein generating respective sets of bits for respective 40 MHz bands of the communication channel comprises generating respective sets each consisting of eight bits.

7. The method of claim 4, wherein:
   generating the allocation information comprises generating respective sets of bits for respective 20 MHz bands of the communication channel, each set of bits including allocation information that indicates an allocation of one or more frequency RUs that overlap the corresponding 20 MHz band in frequency.

8. The method of claim 7, wherein generating respective sets of bits for respective 20 MHz bands of the communication channel comprises generating respective sets each consisting of eight bits.

9. The method of claim 4, wherein:
   generating the PHY header of the DL MU packet to include the allocation information comprises including the allocation information in a first signal field of the PHY header; and
   the method further comprises generating the PHY header to include a second signal field, the second signal field including a bandwidth subfield that indicates the DL MU packet spans the frequency bandwidth greater than 160 MHz.

10. The method of claim 1, wherein:
   allocating the one or more frequency RUs for the MU transmission comprises allocating the one or more frequency RUs for an uplink (UL) MU packet to be transmitted by the communication device;
   transmitting the allocation information to one or more other communication devices comprises transmitting the allocation information in a downlink packet.

11. A communication device configured to operate according to a communication protocol that defines a first set of frequency resource units (RUs) of different bandwidths for use with communication channels spanning at most 160

MHz and a second set of frequency RUs for use with communication channels spanning more than 160 MHz, wherein the first set of frequency RUs includes at least a first subset of frequency RUs having a first bandwidth and a second subset of RUs having a second bandwidth greater than the first bandwidth, and wherein the second set of frequency RUs omits at least some of the frequency RUs in the first subset of frequency RUs of the first set of frequency RUs, the communication device comprising:

a wireless network interface device having one or more integrated circuit (IC) devices configured to:
        determine that a communication channel to be used for a multi-user (MU) transmission spans a frequency bandwidth greater than 160 MHz, and
        allocate one or more frequency RUs for the MU transmission, including:
            in response to determining that the communication channel spans the frequency bandwidth greater than 160 MHz, selecting one or more frequency RUs from the second set of frequency RUs;
    wherein the one or more IC devices are further configured to:
        generate allocation information that indicates the allocation of the one or more frequency RUs for the MU transmission, and
        control the wireless network interface device to transmit the allocation information to one or more other communication devices in connection with the MU transmission.

12. The communication device of claim 11, wherein the one or more IC devices are configured to select one or more frequency RUs from the second set of frequency RUs by selecting the one or more frequency RUs from a set of frequency RUs that omits all of the frequency RUs in the first subset of frequency RUs of the first set of frequency RUs.

13. The communication device of claim 11, wherein the one or more IC devices are configured to select one or more frequency RUs from the second set of frequency RUs by selecting the one or more frequency RUs from a set of frequency RUs that includes one or more frequency RUs having one or more respective frequency bandwidths greater than 160 MHz.

14. The communication device of claim 11, wherein the one or more IC devices are further configured to:
    allocate the one or more frequency RUs for a downlink (DL) MU packet to be transmitted by the communication device;
    generate a physical layer (PHY) header of the DL MU packet to include the allocation information that indicates the allocation of the one or more frequency RUs for the DL MU packet; and
    control the wireless network interface device to transmit the allocation information in the PHY header of the DL MU packet.

15. The communication device of claim 14, wherein the one or more IC devices are further configured to:
    generate the allocation information at least by generating respective sets of bits for respective 40 MHz bands of the communication channel, each set of bits including allocation information that indicates an allocation of one or more frequency RUs that overlap the corresponding 40 MHz band in frequency.

16. The communication device of claim 15, wherein the one or more IC devices are further configured to generate the respective sets of bits, each consisting of eight bits.

17. The communication device of claim 14, wherein the one or more IC devices are further configured to:
    generate the allocation information at least by generating respective sets of bits for respective 20 MHz bands of the communication channel, each set of bits including allocation information that indicates an allocation of one or more frequency RUs that overlap the corresponding 20 MHz band in frequency.

18. The communication device of claim 17, wherein the one or more IC devices are further configured to generate the respective sets of bits, each consisting of eight bits.

19. The communication device of claim 14, wherein the one or more IC devices are further configured to:
    include the allocation information in a first signal field of the PHY header; and
    generate the PHY header to include a second signal field, the second signal field including a bandwidth subfield that indicates the DL MU packet spans the frequency bandwidth greater than 160 MHz.

20. The communication device of claim 11, wherein the one or more IC devices are further configured to:
    allocate the one or more frequency RUs for an uplink (UL) MU packet to be transmitted by the communication device;
    transmitting the allocation information to one or more other communication devices comprises transmitting the allocation information in a downlink packet.

* * * * *